(12) United States Patent
Krieger

(10) Patent No.: US 11,147,241 B2
(45) Date of Patent: Oct. 19, 2021

(54) PET TOY

(71) Applicant: Max Krieger, Pottstown, PA (US)

(72) Inventor: Max Krieger, Pottstown, PA (US)

( * ) Notice: Subject to any disclaimer, the term of this patent is extended or adjusted under 35 U.S.C. 154(b) by 215 days.

(21) Appl. No.: 16/441,506

(22) Filed: Jun. 14, 2019

(65) Prior Publication Data

US 2020/0390064 A1 Dec. 17, 2020

(51) Int. Cl.
*A01K 15/02* (2006.01)
*A43B 3/12* (2006.01)

(52) U.S. Cl.
CPC .............. *A01K 15/025* (2013.01); *A43B 3/12* (2013.01)

(58) Field of Classification Search
CPC ........ A01K 15/025; A01K 15/02; A43B 3/12; A43B 3/122; A43B 3/128; A43B 3/124; A43B 3/14
See application file for complete search history.

(56) References Cited

U.S. PATENT DOCUMENTS

| | | | | |
|---|---|---|---|---|
| 2,517,472 A * | 8/1950 | Fathauer | .............. | A43B 13/141 36/11.5 |
| 4,930,448 A * | 6/1990 | Robinson | ............. | A01K 15/025 119/708 |
| 5,829,391 A * | 11/1998 | Krietzman | ........... | A01K 15/025 119/708 |
| 5,830,035 A * | 11/1998 | Budreck | ................... | A63H 3/14 446/366 |
| 5,924,387 A * | 7/1999 | Schramer | ............. | A01K 15/025 119/708 |
| 6,318,300 B1 * | 11/2001 | Renforth | ............... | A01K 15/025 119/702 |
| 6,892,675 B1 * | 5/2005 | Comerford | .......... | A01K 15/025 119/706 |
| 2003/0136352 A1 * | 7/2003 | Lazarich | .............. | A01K 15/025 119/708 |
| 2008/0230013 A1 * | 9/2008 | Man | ...................... | A01K 15/025 119/708 |
| 2012/0234258 A1 * | 9/2012 | Cook | .................... | A01K 15/025 119/708 |
| 2015/0257364 A1 * | 9/2015 | Renforth | .................. | B25G 1/04 119/708 |

* cited by examiner

*Primary Examiner* — Trinh T Nguyen
(74) *Attorney, Agent, or Firm* — Barley Snyder

(57) ABSTRACT

A pet toy that is foot-operated by a user while playing with a pet and can be used by a barefoot user or over a shoe of a user is provided. The pet toy generally includes a toy shoe, a pair of straps secured to the toy shoe, an elongated flexible member fitted in the toy shoe and extending away from the toy shoe, and an attachment mechanism to which a toy is attached. As the pet toy is operated by a user, the toy is dangled and moved about for the pet.

12 Claims, 4 Drawing Sheets

PET TOY

FIELD OF THE INVENTION

The present invention relates, in general, to pet toys and, in particular, to foot-operated unit to which a toy is attached that is dangled before the pet by a user while playing with a pet and can be used by a barefoot user or over a shoe of a user.

BACKGROUND

Every pet owner knows that pets, especially dogs and puppies, require attention from and interaction with their owners on a frequent basis. In other words, pets need playtime. Engaging in play is important to the physical, mental and emotional health of pets. Play time relieves stress, provides exercise, and strengthens the bond between pets and their owners.

It can be difficult for some pet owners to provide the necessary level of stimulation for their pets due to their busy schedules. For example, college students, who are pet owners, have classes, sports, studies, and other extracurricular activities that keep them busy day and night. Young professionals, who are pet owners, are often at work for eight to ten hours per day. These busy schedules leave little time and energy for pet owners to play with their pets. They want to keep their pets happy, healthy, and entertained, but they also want to eat, relax, and unwind after a long day's work.

A wide variety of toys have been devised to facilitate pet-owner interactive play, including, but not limited to bones, balls, sticks, and various plush toys. There are some drawbacks to using these toys. First, they require the use of at least one hand, which makes it difficult, sometimes impossible, for the pet owner to engage in other activities, such as eating or reading a newspaper, while playing with the pet. Second, they generally require owners to get down on the floor to be on their pet's level if the owners do not want their pets to play on furniture, such as a sofa an owner might be sitting on or furniture in proximity to the owner.

SUMMARY

A pet toy constructed in accordance with the present invention is provided. The pet toy generally includes a toy shoe adapted to be worn on a bare foot of a user or over a shoe of the user. The toy shoe has a base having heel end and a toe end and a sole extending along an upper surface of the base between the heel end of the base and the toe end of the base. A pet toy, constructed in accordance with the present invention, also has a first strap secured to the toy shoe in proximity to the toe end of the base of the toy shoe and a second strap secured to the toy shoe in proximity to the heel end of the base of the toy shoe. A pet toy, constructed in accordance with the present invention, further includes an elongated flexible member fitted in the base of the toy shoe and extends away from the toe end of the base of the toy shoe and an attachment mechanism at the free end of the elongated flexible member.

BRIEF DESCRIPTION OF THE DRAWINGS

The invention will now be described by way of example with reference to the accompanying Figures, of which.

DETAILED DESCRIPTION OF THE INVENTION

Figure 1:
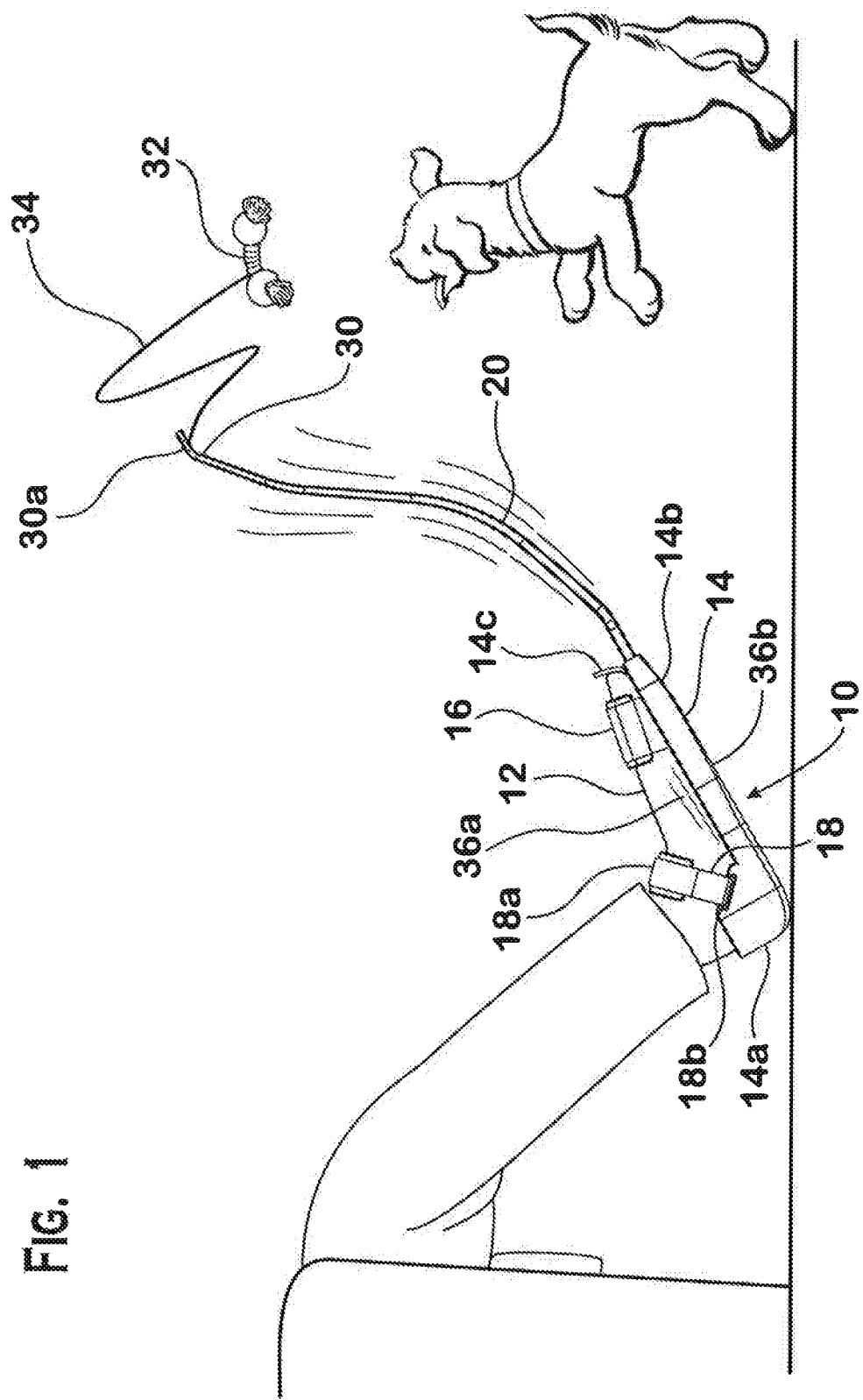
FIG. 1 is a side view of a pet toy constructed in accordance with the present invention being used with a pet.
Figure 2:
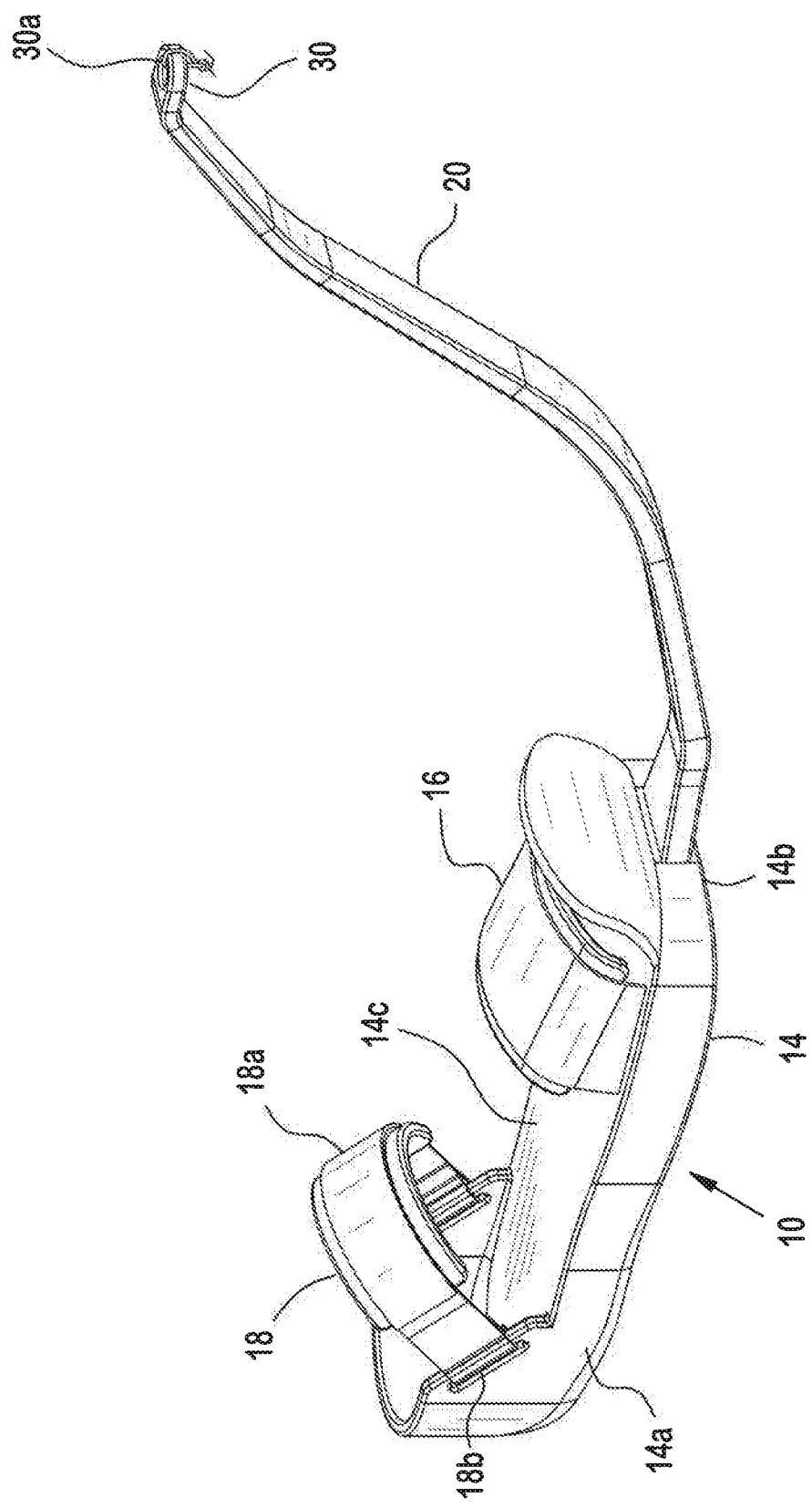
FIG. 2 is a perspective view of a pet toy constructed in accordance with the present invention.

Referring to FIGS. 1 and 2, a pet toy, constructed in accordance with the present invention includes a toy shoe 10 adapted to be worn on a bare foot of a user or over a shoe 12 of the user. Toy shoe 10 has a base 14 that has a heel end 14a and a toe end 14b. Toy shoe 10 also has sole 14c that extends along an upper surface of base 14 between heel end 14a of base 14 and toe end 14b of base 14. Preferably, sole 14c of base 14 extends upward from toe end 14b of base 14 to limit sliding of shoe 12 of a user. Preferably, heel end 14a of base 14 is rounded about a horizontal axis and a vertical axis to accommodate the contour of the heel of the foot 12 of the user.

A pet toy, constructed in accordance with the present invention, also includes a first strap 16 secured to toy shoe 10 in proximity to the toe end 14b of base 14 of the toy shoe and a second strap 18 secured to the toy shoe in proximity to heel end 14a of the base of the toy shoe. For the embodiment of the present invention illustrated and being described, strap 18 has an adjustable effective length to accommodate different size ankles of users of the pet toy. Specifically, a belt 18a of strap 18 is received and set in a buckle 18b of strap 18 by a user of the pet toy.

Figure 4:
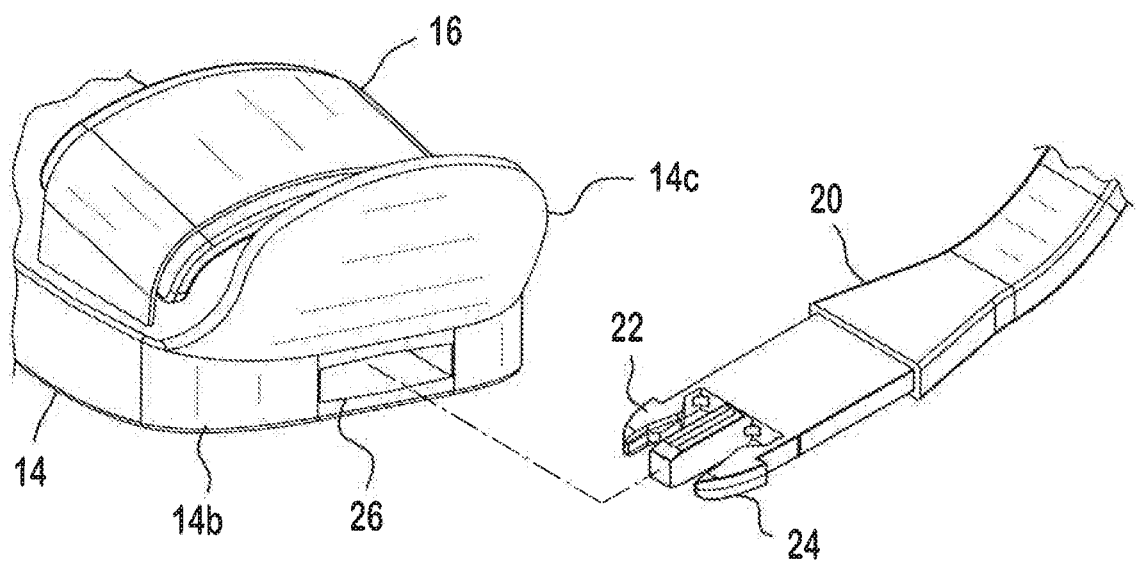
FIG. 4 is an exploded perspective view of a portion of a pet toy constructed in accordance with the present invention.
Figure 5:
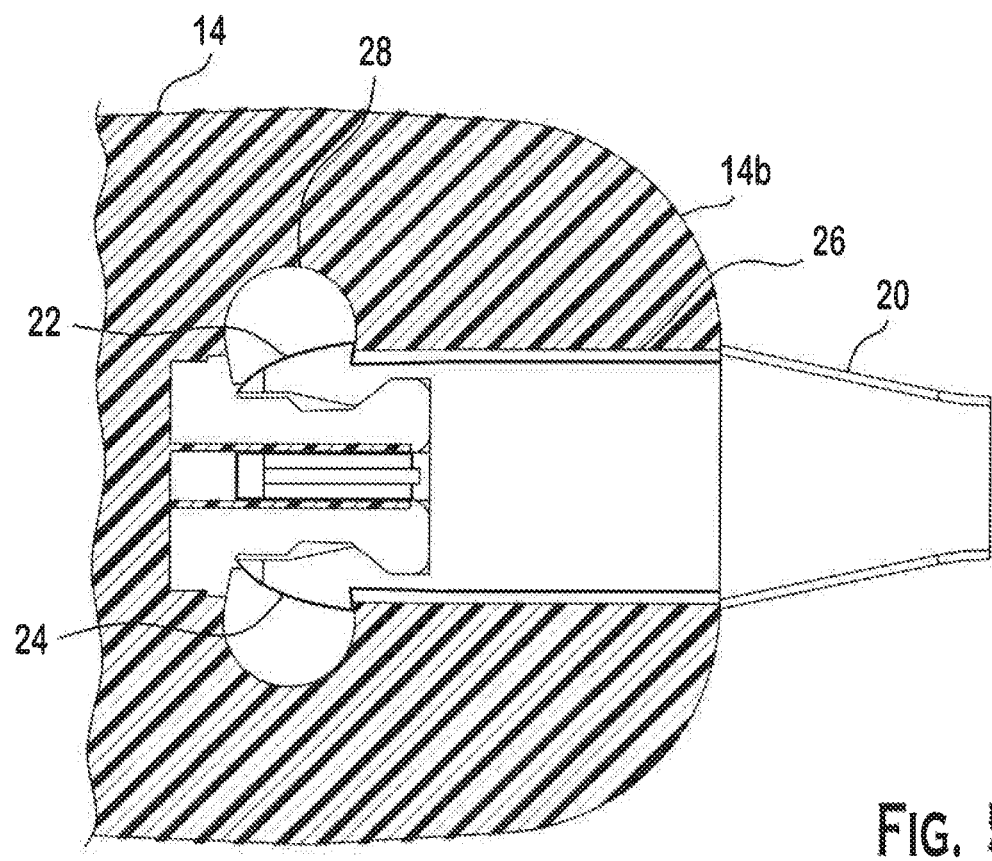
FIG. 5 is a sectional view of the portion of the pet toy illustrated in FIG. 4 after assembly.

A pet toy, constructed in accordance with the present invention, also includes an elongated flexible member 20 fitted in base 14 of toy shoe 10 that extends away from toe end 14b of the base of the toy shoe. For the embodiment of the present invention illustrated and being described, elongated flexible member 20 is selectively removable from base 14 of toy shoe 10. As illustrated in FIGS. 4 and 5, for the embodiment of the present invention illustrated and being described, elongated flexible member 20 is fitted in base 14 of toy shoe 10 by a snap-fit. Specifically, the leading end of elongated flexible member 20 has a pair of flexibly mounted wings 22 and 24 that bend radially inward as they slide through a passage 26 in base 14 of toy shoe 10 until they reach a recess 28 in base 14 of toy shoe 10 at which point they spring radially outward into recess 28 to capture the leading end of the elongated flexible member in the base of toy shoe 10. To remove elongated flexible member 20 from base 14 of toy shoe 10, the leading end of the elongated flexible member squeezed to the extent necessary for wings 22 and 24 to clear recess 28 and permit the wings to slide through passage 26 as the elongated flexible member is withdrawn from the base of the toe shoe.

Figure 3:
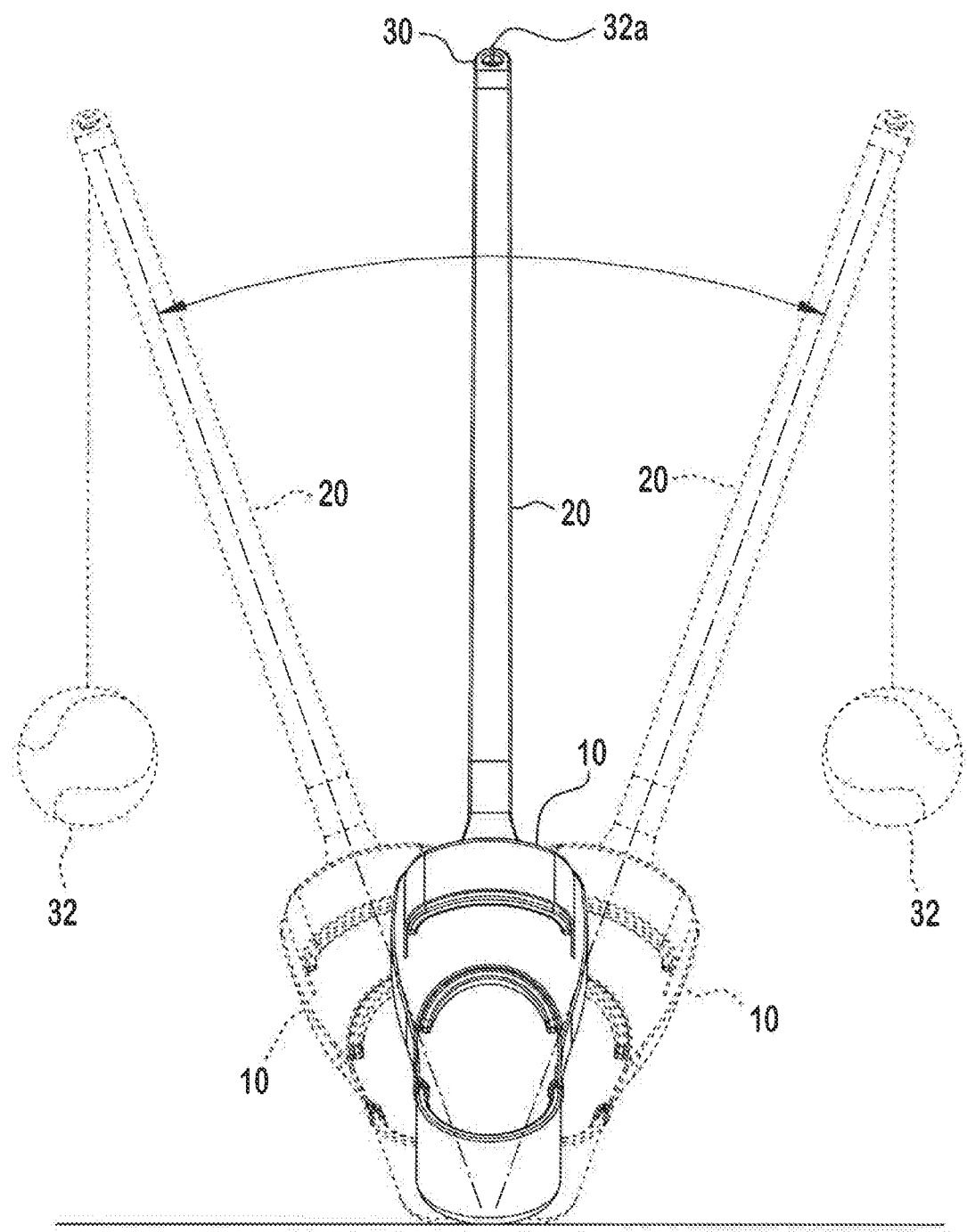
FIG. 3 is a top view of pet toy constructed in accordance with the present invention.

A pet toy, constructed in accordance with the present invention, also includes an attachment mechanism 30 at the free end of the elongated flexible member 20. A toy 32 is selectively attached to attachment mechanism 30 by a string 34 with toy 32 tied to one end of the string and the other end of the string tied to the attachment mechanism through a passage 32a in the attachment mechanism As illustrated most clearly in FIGS. 1 and 3, a pet toy, constructed in accordance with present invention, is free to move horizontally and vertically. The range of horizontal movement is shown in FIG. 3 by dotted line outlines of the pet toy. The range of vertical movement of the pet toy is represented FIG. 1 by lines 34a and 34b above and below toy shoe 10, respectively.

The foregoing illustrates some of the possibilities for practicing the invention. Many other embodiments are possible within the scope and spirit of the invention. It is, therefore, intended that the foregoing description be regarded as illustrative rather than limiting, and that the scope of the invention is given by the appended claims together with their full range of equivalents.

What is claimed is:

1. A pet toy comprising:
a toy shoe adapted to be worn on a bare foot of a user or over a shoe of the user and having a base having a heel end and a toe end and a sole extending along an upper surface of the base between the heel end of the base and the toe end of the base;
a first strap secured to the toy shoe in proximity to the toe end of the base of the toy shoe;
a second strap secured to the toy shoe in proximity to the heel end of the base of the toy shoe;
an elongated flexible member:
(a) fitted in the base of the toy shoe, and
(b) extending away from the toe end of the base of the toy shoe; and
an attachment mechanism at the free end of the elongated flexible member.

2. The pet toy according to claim 1, wherein the elongated flexible member is selectively removable from the base of the toy shoe.

3. The pet toy according to claim 1, wherein the heel end of the base of the toy shoe is rounded.

4. The pet toy according to claim 3, wherein the sole of the base of the toy shoe extends upward from the toe end of the base of the toy shoe.

5. The pet toy according to claim 1, wherein the toy shoe is free to move.

6. The pet toy according to claim 5, wherein the toy shoe is free to move horizontally.

7. The pet toy according to claim 5, wherein the toy shoe is free to move vertically.

8. The pet toy according to claim 1, further including a toy selectively attached to the attachment mechanism.

9. The pet toy according to claim 2, wherein the elongated flexible member is fitted in the base of the toy shoe by a snap-fit.

10. The pet toy according to claim 1, wherein the second strap has an adjustable effective length.

11. The pet toy according to claim 4, wherein the heel end of the base of the toy shoe is rounded about a horizontal axis and a vertical axis.

12. A pet toy comprising:
a toy shoe adapted to be worn on a bare foot of a user or over a shoe of the user and having a base having:
(a) a heel end,
(b) a toe end,
(c) a sole extending along an upper surface of the base between the heel end of the base and the toe end of the base, and
(d) a passage leading to a recess;
a first strap secured to the toy shoe in proximity to the toe end of the base of the toy shoe;
a second strap secured to the toy shoe in proximity to the heel end of the base of the toy shoe; and
an elongated flexible member:
(a) fitted in the base of the toy shoe by a snap fit,
(b) selectively removable from the base of the toy shoe,
(c) extending away from the toe end of the base of the toy shoe; and
(d) having a leading end that has a pair of radially flexible wings and received in the recess of the base of the toy shoe of the toy shoe an attachment mechanism at the free end of the elongated flexible member.

* * * * *